W. P. BARTHOLOW.
COMBINED SOLDERING IRON AND BLOW TORCH.
APPLICATION FILED MAY 22, 1911.
1,024,170.
Patented Apr. 23, 1912.
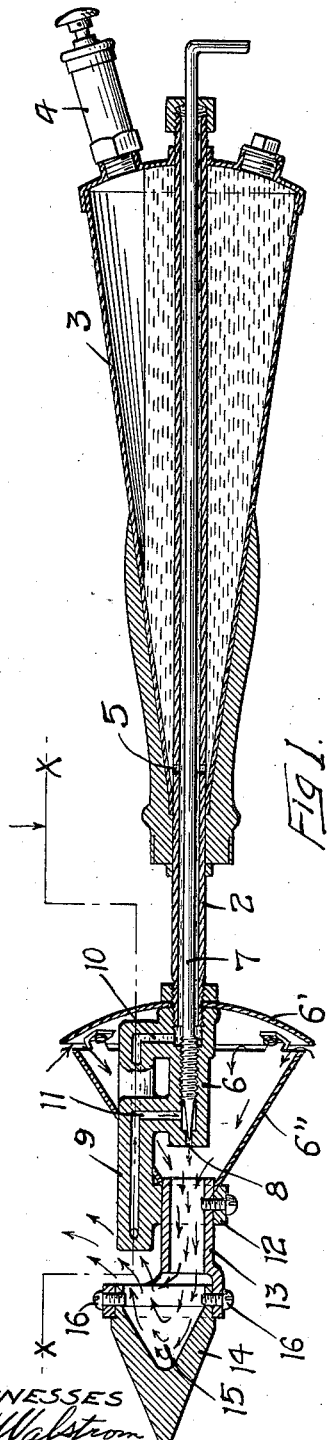
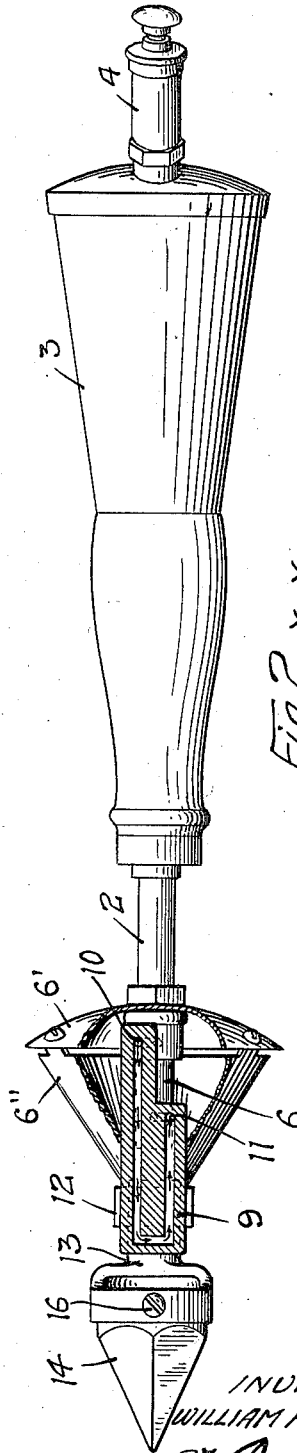

UNITED STATES PATENT OFFICE.

WILLIAM P. BARTHOLOW, OF MINNEAPOLIS, MINNESOTA, ASSIGNOR TO THE DOBBINS MANUFACTURING COMPANY, OF MINNEAPOLIS, MINNESOTA, A CORPORATION OF SOUTH DAKOTA.

COMBINED SOLDERING-IRON AND BLOW-TORCH.

1,024,170.  Specification of Letters Patent.  Patented Apr. 23, 1912.

Application filed May 22, 1911. Serial No. 628,842.

*To all whom it may concern:*

Be it known that I, WILLIAM P. BARTHOLOW, of Minneapolis, Hennepin county, Minnesota, have invented certain new and useful Improvements in Combined Soldering-Irons and Blow-Torches, of which the following is a specification.

My invention relates to that class of devices shown and described in Letters Patent of the United States issued to me June 21, 1904, No. 763,243, and the primary object of my present invention is to provide a construction which will insure the heating of the retort and the generation of gas within a comparatively short time after the burner is ignited.

My invention consists generally in various constructions and combinations, all as hereinafter described and particularly pointed out in the claims.

In the accompanying drawings forming part of this specification, Figure 1 is a longitudinal, sectional view of the soldering iron and blow torch embodying my invention, Fig. 2 is a sectional view on line x—x of Fig. 1.

In the drawing, 2 represents a hollow shank or tube inclosed by an oil reservoir 3 which is preferably conical in form, and has a pump 4 by means of which the oil in the reservoir is put under compression as usual in devices of this kind. The shank 2 has feed ports 5 and a burner 6 is mounted on the end of said tube and is provided with a needle valve 7, by means of which the port 8 in the burner is opened or closed. A retort 9 is formed on one side of the burner, having a duct 10 which communicates with the end of the shank 2 and through which the oil from the reservoir flows into the retort, and an outlet duct 11 communicates with the duct 10 within the retort and discharges into the burner near the port 8. A bracket 12 depends from the retort and carries a sleeve 13, concentric with the port 8 and spaced therefrom and upon this sleeve I mount a conical point 14, preferably of copper, having a recess, preferably cone-shaped, therein. This recess is located in the path of the flame from the burner and the flame, striking the inclined wall of the recess on one side, is deflected toward the opposite side of the recess and from thence is deflected upwardly against the walls of the retort, causing the wall to become heated and vaporizing the oil in the ducts so that, soon after lighting the burner, a sufficient amount of gas will be generated in the retort to fully supply the burner. The burner, as shown in the drawing, is disposed at one side of the center of the conical point and the recess therein, and the flame from the burner will contact, therefore, with the walls of the recess at one side of the center and be deflected toward the wall on the other side of the center and from thence will shoot backwardly against the wall of the retort and heat it sufficiently to vaporize the oil. I have found that by disposing the burner and point in the manner described that the flame will be retarded by contact with the walls of the recess to a considerably less degree and the retort will be heated quicker and more effectually than where the burner is in line with the apex of the recess in the point. The outer portion of the sleeve 13 has a socket to receive the soldering point 14, which is secured in the socket by a suitable means, such as the screws 16. Upon removing these screws the point may be detached to adapt the device for use as a blow-torch. A shield 6' is mounted on the forward portion of the shank and a conical guard 6'' incloses the burner and is secured to the outer portion of the shield and is spaced therefrom a sufficient distance to permit air to flow into the conical guard and supply the burner.

The location of the soldering point eccentrically with respect to the burner nozzle, causes the burner flame to impinge the wall of the recess in the soldering point on one side of the center and be directed against the opposite wall of the recess and from thence against the retort. This insures the rapid heating of the walls of the retort and the vaporizing of the oil therein.

I claim as my invention:—

1. A device of the class described comprising an oil reservoir, a feed pipe leading therefrom, a burner having a needle valve, a retort having an oil inlet and discharge duct communicating respectively with said feed pipe and said burner, a soldering point disposed in front of said burner and eccentrically with respect to the burner nozzle, said point having a conical recess therein, the burner flame impinging on the wall of said recess on one side of the center of said point and being directed thereby against the opposite wall of the recess, said retort being located in the path of the flame deflected by said opposite wall.

2. A device of the class described comprising a reservoir and a feed pipe leading therefrom, a burner having a needle valve, a retort disposed at one side of said burner and projecting in front of the same, a soldering point mounted in front of said burner and having a conical recess in the path of the flame from said burner, said burner being on one side of the center of said recess and said retort on the opposite side of the center of said recess, the flame from said burner impinging on the wall of said recess on one side and being deflected thereby across the recess against the wall on the other side and from thence backwardly against said retort.

In witness whereof, I have hereunto set my hand this 19th day of May, 1911.

WILLIAM P. BARTHOLOW.

Witnesses:
GENEVIEVE E. SORENSEN,
C. H. REHFUSS.

Copies of this patent may be obtained for five cents each, by addressing the "Commissioner of Patents, Washington, D. C."